Oct. 2, 1956     F. B. MILLER     2,764,903
TORQUE RESPONSIVE PLANETARY TRANSMISSION MECHANISM
Filed June 29, 1953
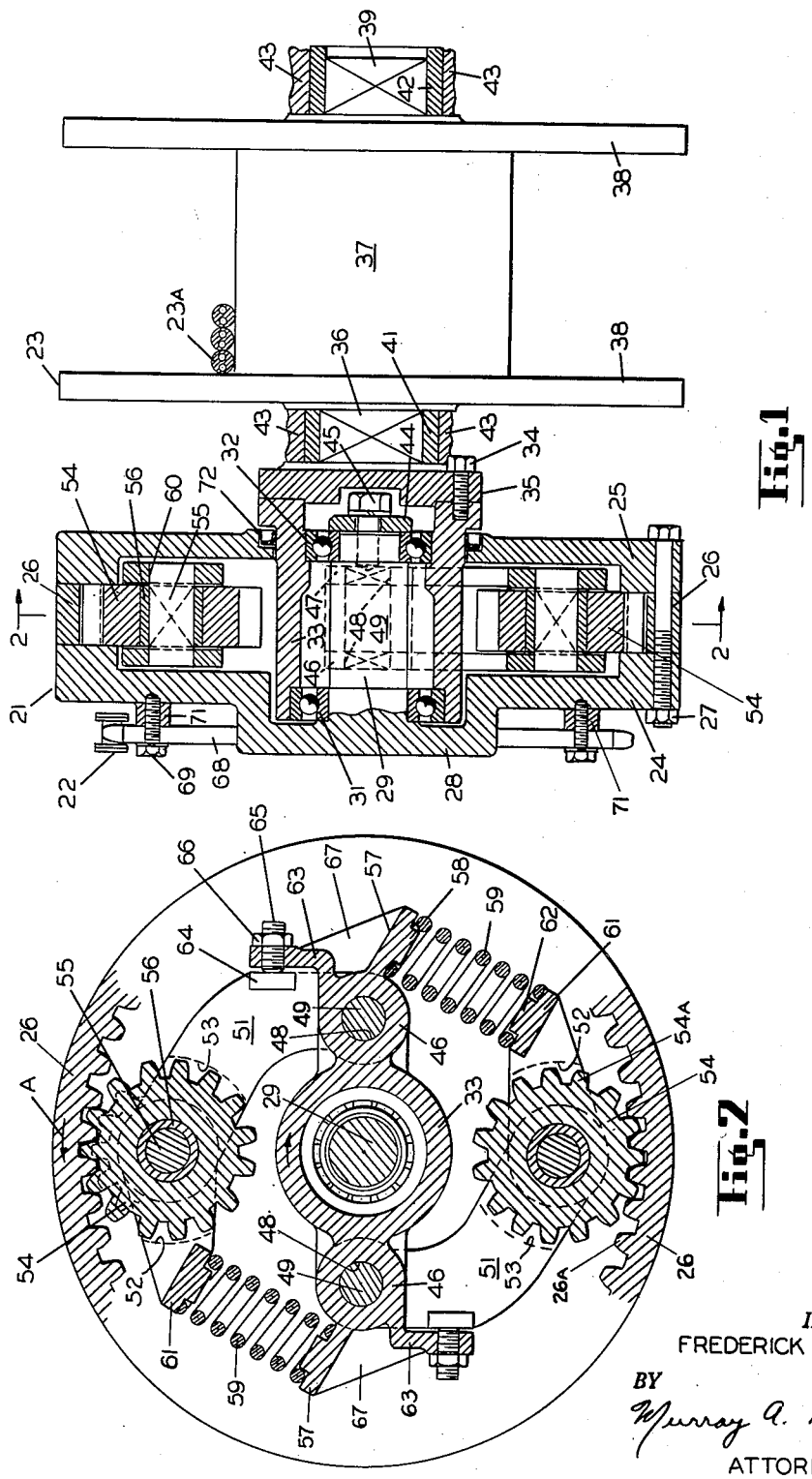
INVENTOR.
FREDERICK B. MILLER
BY
Murray A. Gleeson
ATTORNEY

2,764,903

TORQUE RESPONSIVE PLANETARY TRANSMISSION MECHANISM

Frederick B. Miller, Chicago, Ill., assignor to Goodman Manufacturing Company, Chicago, Ill., a corporation of Illinois Application June 29, 1953, Serial No. 364,577

4 Claims. (Cl. 74—751)

This invention relates to improvements in fluid drag transmission mechanisms for cable reels adapted for use with electrically propelled vehicles in mines, although not limited to such use.

For example, in underground coal mining, large vehicles called shuttle cars are used to transport coal from the working face to a main loading station. These shuttle cars are often powered by electric motors, supplied by current through cables attached to a power outlet conveniently located along the path of travel of the vehicle. The cable is wound on a cable reel, which automatically pays out or reels in the cable, also maintaining a more-or-less constant tension on the cable, to prevent the car from running over the cable. Heretofore, several types of expensive and complicated electrical or hydraulic tensioning mechanisms have been employed to tension the cable.

One object of the present invention is to provide a relatively simple, inexpensive and yet efficient form of fluid drag or transmission mechanism, capable of exerting a substantial drag or tension on the cable while the cable is being unwound at relatively slow speeds, yet capable of relieving such tension automatically when said tension on the cable tends to increase due to higher drum speeds, so as to maintain a substantially uniform cable tension under normal operating conditions.

The invention may best be understood by reference to the accompanying drawings, in which:

Figure 1 is a vertical section of one embodiment of my invention taken along the axis of rotation of the fluid drag mechanism but showing an associated cable reel partly in elevation;

Figure 2 is a section taken on line 2—2 of Figure 1.

Referring now to details shown in the drawing, the fluid drag mechanism is indicated generally at 21. Driving power is supplied through a chain 22 from a suitable continuously rotating power source, not shown. The fluid drag mechanism then transmits the power to a cable reel 23 having a cable 24 wound thereon, to keep said cable taut.

The drag mechanism 21 comprises two opposed disc-shaped housing members 24, 25 having an internal gear ring 26 held therebetween as by bolts 27. The housing disc 25b is formed with an offset central section 28 having an internal axial extension 29. At the base of this extension and at its end are mounted ball bearings 31 and 32 rotatably supporting a sleeve 33 connected by studs 34 to the flanged portion 35 of a cable reel shaft 36 supporting the cable reel 23. The latter, comprising a drum 37 and discs 38, 38, is provided with a shaft extension 39 on the side opposite shaft 36 and the entire assembly is supported for rotation in bearings 41 and 42 which, in turn, are carried in the moving frame, for example, in the frame 43 of a shuttle car or other vehicle being supplied with electric current through the electric cable 23a.

The inner end of the extension 29 is provided with a retainer cap 44 engaging the inner race of the bearing 32 and held in place by a stud 45.

Referring now to the mechanism on the interior of the coupling discs, which comprises the principal subject matter of the present invention, the exterior of the sleeve 33 is formed integral with a plurality (in this case, two) of pairs of bosses 46, 46. These pairs of bosses extend in circumferentially spaced relation from the sleeve, herein diametrically (Figure 2), and each boss is formed with a bore 48 containing a pivot pin 49 on which is pivotally mounted a generally arcuate-shaped arm 51. As will be seen in the drawings, there are two of these arms in the particular embodiment shown; it will be obvious that more or less may be employed depending upon the needs of the particular installation. Each arm 51 is hollowed out along lines 52 and 53 to receive a pinion 54 having a sleeve bearing 56 and rotatably supported on a pin 55 carried in bores 60 in opposite sides of the arm 51. Each of the pinions 54 has teeth meshing in close-fitting relation with the teeth 26a on internal ring gear 26. The opposite ends of pinion teeth are fitted between the adjacent side walls of the housing plates 25 and 25a with relatively small clearance, for a purpose to be presently described.

Each boss 46 has a short plate section 57 at its outer end, carrying a spud 58 and comprising one seat for a compression coil spring 59. The free end of each arm 51 is also provided with a similar plate section 61 carrying a spud 62 and comprising the other seat for one of the springs 59. Thus, each spring functions to urge its corresponding arm outward to press its pinion 54 into mesh with the internal ring gear teeth.

Each boss 46 also has a short plate section 63 running substantially parallel with a mating section 64 on the adjacent arm 51. Each section 63 is drilled and tapped to receive a set screw 65 held in place by lock nut 66 and engaging the arm plate 64 to form a suitable stop, limiting outward movement of the arm. Each pair of plates 57 and 63 is joined by a strengthening web 67.

A driving sprocket 68 is meshed with driving chain 22 and held onto the outside of coupling disc 24 by means of a plurality of studs 69 and spacer washers 71.

The interior of the ring gear casing is adapted to be filled with oil of suitable viscosity. Leakage is prevented by an oil seal 72 retained in coupling disc 25b and running against the exterior of the sleeve 33.

The use and operation of the device is as follows:

Assume that the drag mechanism is used to regulate the holdback tension on the electric power cable 23a supplying the motor of an underground shuttle car used in mining: the chain 22 connected to a suitable sprocket on the shuttle car will rotate the ring gear casing, preferably in the direction of the arrow A shown in Figure 2. This direction of rotation is preferred because it tends to thrust the pinions 54 away from the ring gear, in opposition to the pressure exerted by the springs 59 at a substantial angle to the radii of the ring gear passing through the axes of their respective pinions, which angle for convenience may be termed "semi-tangential." The speed of rotation of the ring gear may be either fixed or variable, but is such as to urge the cable reel 23 constantly in a direction tending to maintain tension in the cable 23a, yet permitting the cable to be payed out as the vehicle is moved away from the power source or reeled in as it is moved toward the power source.

It will be observed that the pinions 54, if free to rotate relative to the ring gear, would normally act as idlers, so that the sleeve 33 with its arms 51 would, likewise, be free to rotate in either direction relative to the ring gear, and vice versa. However, as the ring gear is rotated, it picks up a thick layer of oil which is maintained against the teeth by centrifugal action. This oil becomes trapped between the teeth of the pinions 54 and the ring gear as these teeth come into mesh and, since the pinions are pressed constantly into mesh by the springs 59, there will be a resistance and partial vacuum set up between the teeth of the pinion and ring "gear" as said teeth rotate in meshed relation, between the close fitting side walls of the gear case. This causes a retardation in the free idling of pinions 54 which, in turn, produces a constant backward drag on the cable reel. When the load is large, as when unreeling fast or during starting of the vehicle, the backward drag on the reel will be automatically relieved to some extent by partial movement of pinions 54 out of mesh against the tension of springs 59, as indicated in a somewhat exaggerated manner by broken lines at the top of Figure 2, to permit the oil to escape more readily from between the partially meshed pinion and ring gear teeth. By proper balance between the viscosity of the oil the degree of limited clearance afforded between the opposite ends of the pinion teeth and the adjacent side walls of the casing and the tension of the springs, the amount of drag on the reel may be maintained substantially constant in the direction of unreeling under all normal operating conditions.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. In a fluid drag or holdback mechanism for cable reels, a power-driven enclosed oil-tight casing having an internal gear, a driven member rotatably mounted concentrically in said casing and having at least one pinion rotatably carried thereon for movement toward and away from said internal gear, yieldable means on said driven member normally urging said pinion into meshed relation with said internal gear, the teeth of said pinion having close-fitting relation with the teeth of said ring gear, and also having limited clearance at opposite ends with the adjacent side walls of said casing, to entrap oil between said pinion teeth and the teeth of said internal gear to afford retardation of rotation of said pinion relative to said internal gear.

2. A drag mechanism in accordance with claim 1, wherein the yieldable means is effective at a substantial angle to the radius of the ring gear, passing through the axis of the pinion so as to tend to release the oil entrapped between the gear teeth more when the internal gear is rotated in one direction than the other, relative to the driven member.

3. A drag mechanism in accordance with claim 1, wherein the pinion is rotatably mounted on an arm pivotally connected at one end to the driven member, and the yieldable means urges the arm radially outwardly.

4. A drag mechanism in accordance with claim 3, wherein the yieldable means consists of a compression spring mounted on the side of the driven member opposite the pivotal mounting of the arm, and acting on the free end of the arm at a substantial angle to the radius of the ring gear, passing through the axis of the pinion.

References Cited in the file of this patent

UNITED STATES PATENTS

| | | |
|---|---|---|
| 924,266 | Palmer | June 8, 1909 |
| 2,151,198 | Gillson | Mar. 21, 1939 |
| 2,382,114 | Stephens | Aug. 14, 1945 |